United States Patent
Härmä et al.

(10) Patent No.: US 6,895,256 B2
(45) Date of Patent: May 17, 2005

(54) OPTIMIZED CAMERA SENSOR ARCHITECTURE FOR A MOBILE TELEPHONE

(75) Inventors: Esa Härmä, Salo (FI); Kristian Vaajala, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 535 days.

(21) Appl. No.: 09/732,316

(22) Filed: Dec. 7, 2000

(65) Prior Publication Data

US 2002/0111188 A1 Aug. 15, 2002

(51) Int. Cl.[7] .............................. H04B 1/38; H04M 1/00
(52) U.S. Cl. ............................... 455/556.1; 455/550.1; 348/14.01
(58) Field of Search .......................... 455/151.4, 550.1, 455/552.1, 556.2, 557, 551, 556.1; 348/14.01, 14.02, 14.03, 14.12

(56) References Cited

U.S. PATENT DOCUMENTS

| | | | |
|---|---|---|---|
| 4,605,956 A | | 8/1986 | Cok |
| 6,122,526 A | * | 9/2000 | Parulski et al. ........... 455/556.1 |
| 6,427,066 B1 | * | 7/2002 | Grube ......................... 455/73 |
| 6,452,626 B1 | * | 9/2002 | Adair et al. ................ 348/158 |
| 6,456,607 B2 | * | 9/2002 | Arai et al. .................. 370/335 |
| 6,549,235 B1 | * | 4/2003 | Fossum et al. ............. 348/308 |
| 6,580,457 B1 | * | 6/2003 | Armstrong et al. ......... 348/317 |
| 6,633,231 B1 | * | 10/2003 | Okamoto et al. ....... 340/539.11 |

FOREIGN PATENT DOCUMENTS

EP        954150 A    11/1999

OTHER PUBLICATIONS

Hsieh, J. Y. F. et al., "Low–Power Parallel Video Compression Architecture For a Single Chip Digital CMOS Camera", Journal of VLSI Signal Processing Systems For Signal, Image, and Video Technology, Kluwer Academic Publishers, Dordrecht, NL, vol. 21, No. 3, Jul. 1999, pp. 195–207, XP000849104.

* cited by examiner

*Primary Examiner*—Simon Nguyen
(74) *Attorney, Agent, or Firm*—Ware, Fressola, Van Der Sluys & Adolphson LLP

(57) ABSTRACT

A mobile terminal includes a lens/filter combination, a single-chip camera module and an integrated mobile terminal processor. The lens/filter combination responds to an image, for providing an optical image signal. The single-chip camera module responds to the optical image signal, and to an integrated mobile terminal processor control signal, for performing analog image processing functions (such as correlated double sampling (CDS) and automatic gain control (AGC)) before an analog-to-digital conversion (ADC), basic sensor driving and adjustment functions (such as pixel access, timing and basic automatic exposure control), and digital input/output (I/O) functions, and providing a sensor data output signal and a single-chip camera module control bus signal. The integrated mobile terminal processor responds to the sensor data output signal, and to the single-chip camera module control bus signal, for performing camera control and data conversion functions, for providing the integrated mobile terminal processor control signal.

21 Claims, 5 Drawing Sheets

(The Basic Embodiment)

FIG. 1 *(Prior Art)*

FIG. 2 (The Basic Invention)

FIG. 3 (The Basic Embodiment)

FIG. 4 *(Examples of CFA Interpolation)*

FIG. 5 (Examples of CFA (Color Filter Array) Interpolation)

GREEN FOR RED / BLUE FOR RED / RED & BLUE FOR GREEN

OPTIMIZED CAMERA SENSOR ARCHITECTURE FOR A MOBILE TELEPHONE

BACKGROUND OF THE INVENTION

1. Field of Invention

The present invention relates to a mobile phone; and, more particularly, to a mobile phone having a camera and a signal processor for sending and receiving camera signals to/from the internet.

Future mobile terminals will need to be capable of sending multimedia messages from phone to phone and phone to internet and vice versa. An integrated or an accessory digital camera is, therefore, a useful additional function in a mobile phone.

2. Description of Related Art

Figure 1:
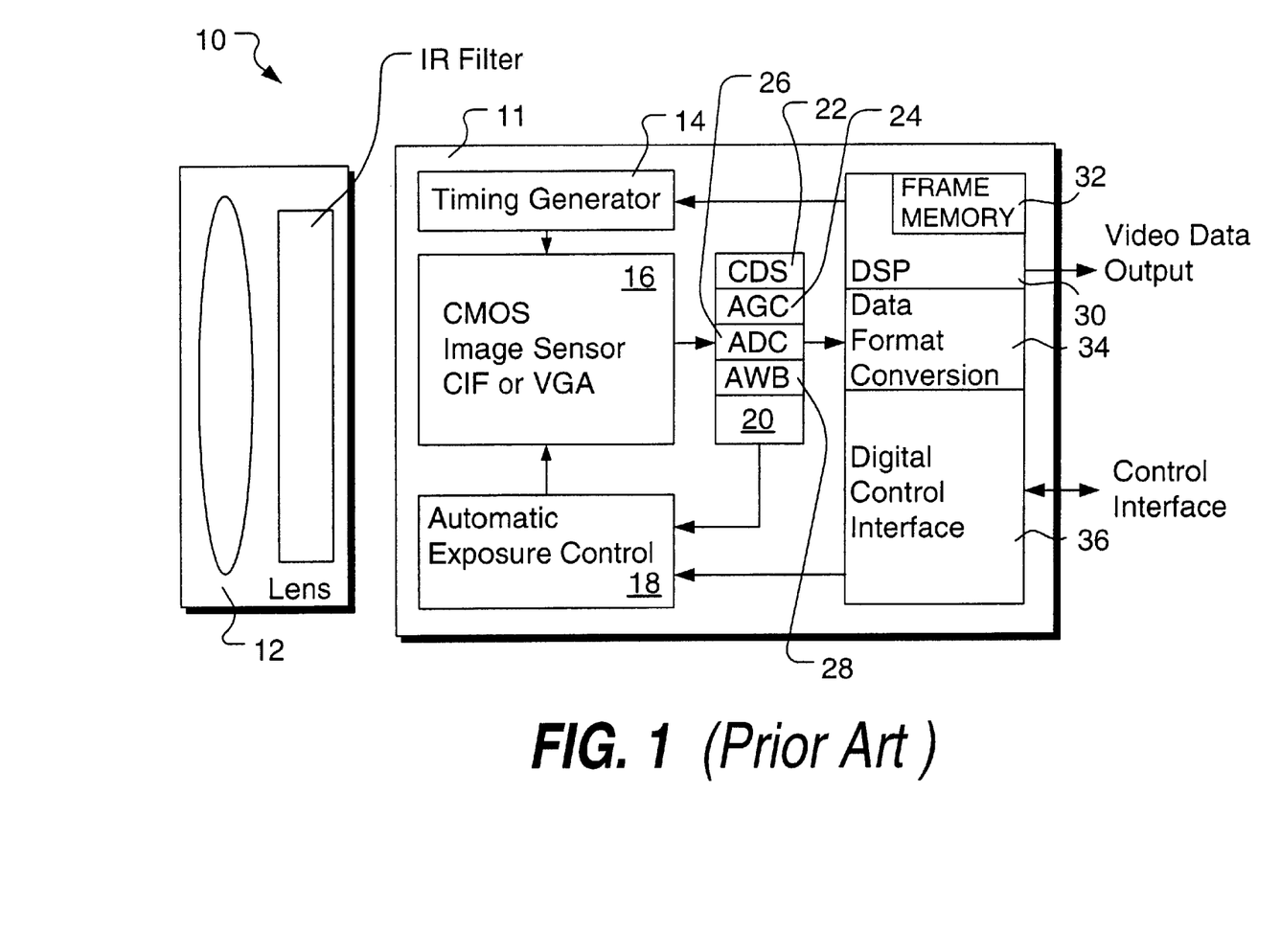
FIG. 1 is a block diagram of a digital camera known in the prior art.

FIG. 1 shows a known digital camera generally indicated as 10 using complimentary metal oxide semiconductor (CMOS) sensor technologies and a digital signal processor (DSP) for camera control and format conversions, e.g., color filter array interpolation and red/green/blue (RGB) to digital component video conversion. Color filter arrays are known in the art, and a Bayer color filter array is one example of the same which is described in U.S. Pat. No. 4,605,956 (issued to Eastman Kodak). U.S. Pat. No. 4,605,956 discloses a single-chip electronic color camera with color-dependent birefringent optical spatial frequency filter and red and blue signal interpolating circuits, which provides a way for generating interpolated RGB from a single sensor.

The digital camera 10 includes a camera module 11 having a lens/filter combination 12, a timing generator 14 for performing timing functions and a CMOS image sensor 16 using a common intermediate format (CIF) or a video graphics array (VGA) for performing image sensing functions. In operation, frame size in video capture and still picture capture are different so that a conversion from a video graphics array (VGA) sensor data to common interface format (CIF) or other video frame size is carried out in the data format conversion function 34 as a DSP 30 software algorithm.

The camera module 11 also has an automatic exposure control 18 for performing automatic time control functions, an interface 20 having a correlated double sampling (CDS) circuit 22 for performing correlated double sampling functions, an automatic gain control (AGC) circuit 24 for performing automatic gain control functions, an analog-to-digital conversion circuit 26 (ADC) for performing analog-to-digital conversion functions, an automatic white balance circuit (AWB) 28 for performing automatic white balance functions, a digital signal processor 30 with a frame memory 34 for performing digital signal processing functions, a data format conversion module 34 for performing data format conversion functions, and a digital control interface module 36 for performing digital control interface functions.

Mobile phones are built using customized integrated circuits to gain small size. These circuits are using the latest low power processing technology and it is, therefore, desirous to integrate as much processing into this circuitry as possible. It is desirous to remove as much functionalities from the camera module 11 as possible in order to make it possible to build a single chip camera module.

SUMMARY OF INVENTION

The present invention provides a mobile terminal having a lens/filter combination that responds to an image, for providing an optical image signal. The mobile terminal also includes a single-chip camera module and an integrated mobile terminal processor.

In operation, the single-chip camera module responds to the optical image signal, and further responds to an integrated mobile terminal processor control signal, for performing analog image processing functions before an analog-to-digital conversion (ADC), basic sensor driving and adjustment functions, and digital input/output (I/O) functions, and providing a sensor data output signal and a single-chip camera module control bus signal. The analog image processing functions include correlated double sampling (CDS) and automatic gain control (AGC). The basic sensor driving and adjustment functions include pixel access, timing and basic automatic exposure control.

Further, the integrated mobile terminal processor responds to the sensor data output signal, and further responds to the single-chip camera module control bus signal, for performing camera control and data conversion functions, and for providing the integrated mobile terminal processor control signal.

In the mobile terminal of the present invention, the camera control resides in the mobile terminal processor and overrides basic sensor driving and adjustment functions in operation. Data conversions are only carried out in the mobile terminal processor. Sampled data from the sensor is transmitted to the mobile terminal either as raw full frame data or as sub-sampled data which according to this invention can be interpreted as RGB representation of a smaller frame size. With the present invention, it is also possible to configure the sub-sampling process in such a way that 11:12 horizontal compression for viewing in TV technology based terminals becomes possible. Further, the use of CMOS sensor technology makes it possible to integrate the sub-sampling process into the pixel access circuitry, which further can be made configurable from the terminal processor. For example, a look-up table with bit mapped pixel positions for reading and sending the data further can be modified by the mobile terminal processor to prevent reading from dead pixel positions in the sensor thus creating an effective dead pixel concealment algorithm.

In summary, the mobile terminal camera of the present invention with optimized architecture for picture and video capture includes: a single chip camera module using fast serial interface to transmit data to a "engine" with the frame memory in the data processing engine; and data transmitted either as full frame sampled data (raw data) from the sensor that is processed further in the mobile terminal processor to RGB and other presentations or as sub-sampled sensor data already in RGB presentation of a smaller frame size (e.g. CIF) that does not need any further processing in the mobile terminal.

Sub-sampling process described herein will compress the frame information with 11:12 ratio enabling distortion free viewing in TV technology based screens used as base line requirement in many video compression standards.

The sub-sampling function generating the RGB representation is integrated into the pixel read access circuitry in which selected pixels can be read to the output of the sensor for transmitting to the mobile terminal processor over the fast serial interface. This function is programmable e.g. as a look-up table in which each memory bit is mapped to one pixel in the sensor array. Default setting after power up would be reading all pixels. The processor in the mobile terminal can white different pixel combinations in this memory generating different sub-sampling configurations.

Other methods besides the look-up table are possible here e.g. an algorithmic presentation of the pixels to be read can be also generated. The processor would then read the parameters of the algorithm and read the pixels accordingly.

An effective dead pixel concealment algorithm can be created using the programmable read access circuit, too. This can be done with an algorithm running in the mobile terminal processor by disabling dead pixels in the sensor array and selecting pixels next to the dead pixel to be read instead of the dead one.

Advantages of the present invention include the following:

(1) reduced sensor size because of reduced processing needs i.e. no calculations for interpolation are needed in the sensor;
(2) reduced power consumption because sensor is smaller and sub-sampling reduces data transmission over the interface;
(3) reduced processing requirements in the mobile terminal because RGB presentation is generated in the sensor with simple and effective means; and
(4) video format for viewing in 12:11 pixel aspect ratio displays used as base line requirement e.g. in H.263 standard based video terminals can be generated without excessive processing.

DETAILED DESCRIPTION OF INVENTION

Figure 2:
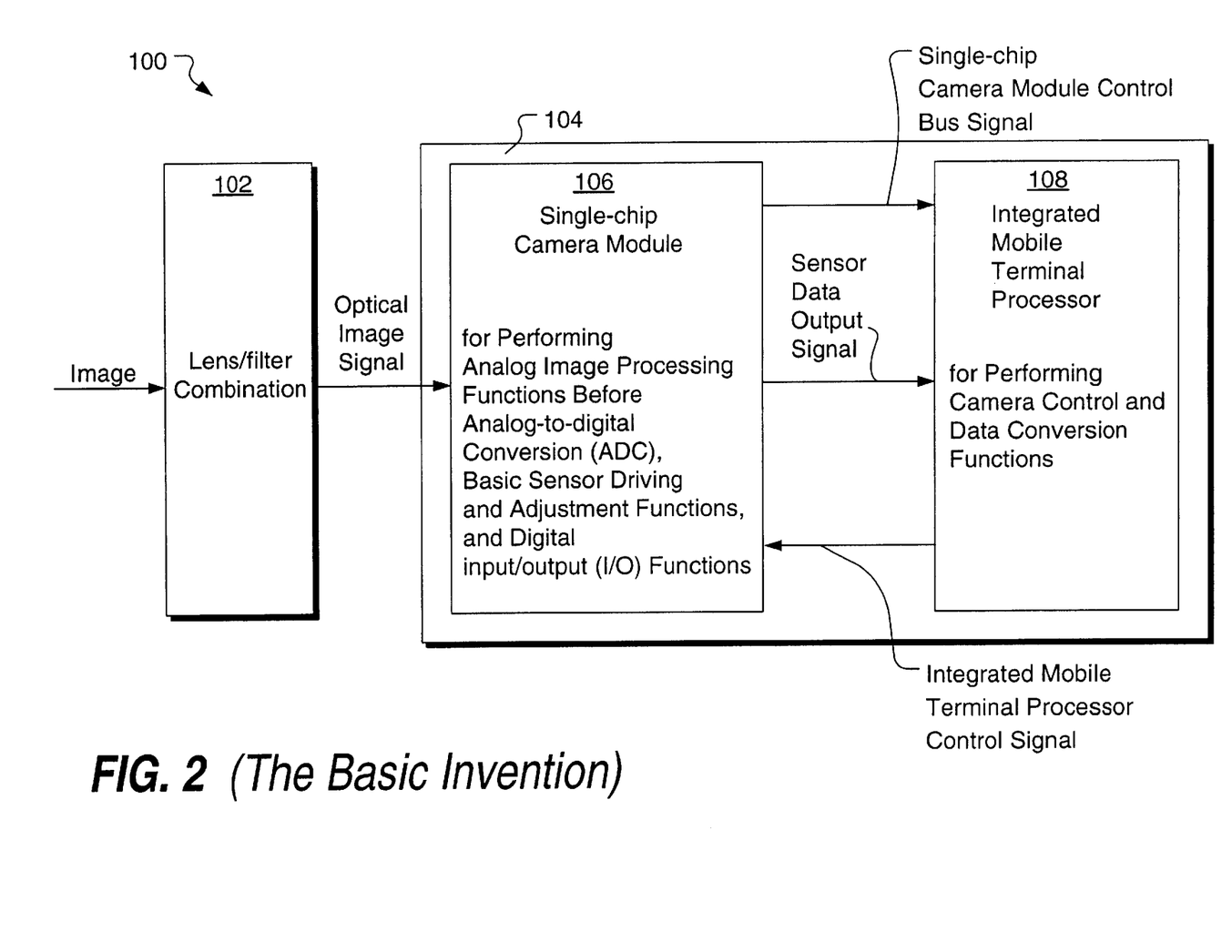
FIG. 2 is a block diagram of a mobile terminal having camera circuitry that is the subject matter of the present invention.

FIG. 2: The Basic Invention

FIG. 2 shows a mobile terminal generally indicated as 100 having a lens/filter combination 102 that responds to an image, for providing an optical image signal. The mobile terminal includes camera circuitry 104 having a single-chip camera module 106 and an integrated mobile terminal processor 108.

In operation, the single-chip camera module 106 responds to the optical image signal, and further responds to an integrated mobile terminal processor control signal, for performing analog image processing functions before an analog-to-digital conversion (ADC), basic sensor driving and adjustment functions, and digital input/output (I/O) functions, and providing a sensor data output signal and a single-chip camera module control bus signal to the integrated mobile terminal processor 108. The analog image processing functions include correlated double sampling (CDS) and automatic gain control (AGC). The basic sensor driving and adjustment functions include pixel access, timing and basic automatic exposure control. The single-chip camera module 106 is described in more detail in relation to FIG. 3.

Further, the integrated mobile terminal processor 108 responds to the sensor data output signal, and further responds to the single-chip camera module control bus signal, for performing camera control and data conversion functions, and for providing the integrated mobile terminal processor control signal to the single-chip camera module 106.

In the mobile terminal 100, the camera control resides in the mobile terminal processor 108 and overrides basic sensor driving and adjustment functions in operation. Data conversions are only carried out in the mobile terminal processor 108. Sampled data from the sensor is transmitted to the mobile terminal 100 either as raw full frame data or as sub-sampled data which according to this invention can be interpreted as RGB representation of a smaller frame size.

As discussed below, it is also possible to configure the sub-sampling process in such a way that 11:12 horizontal compression for viewing in TV technology based terminals becomes possible.

Further, as discussed below, the use of CMOS sensor technology makes it possible to integrate the sub-sampling process into the pixel access circuitry, which further can be made configurable from the terminal processor. For example, a look-up table with bit mapped pixel positions for reading and sending the data further can be modified by the mobile terminal processor to prevent reading from dead pixel positions in the sensor thus creating an effective dead pixel concealment algorithm.

Figure 3:
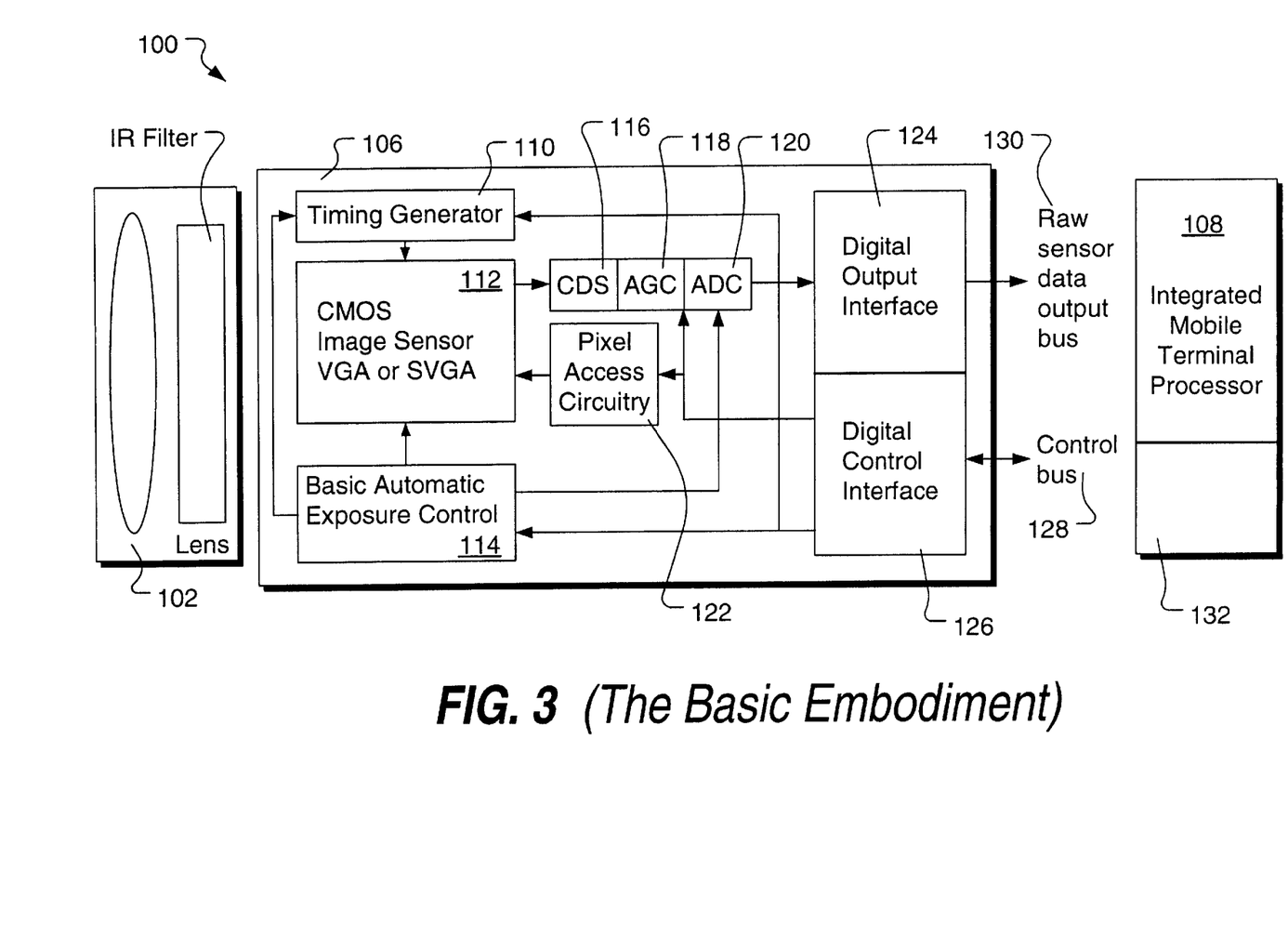
FIG. 3 is a block diagram of a detailed embodiment of the mobile terminal shown in FIG. 2.

The integrated mobile terminal processor 108 is described in more detail in relation to FIG. 3.

FIG. 3

FIG. 3 shows a more detail diagram of an optimized architecture for the mobile terminal 100 having an attached camera.

The mobile terminal 100 includes the lens/filer combination 102.

The single-chip camera module 106 includes a timing generator 110 for performing timing generator functions, a complimentary metal oxide semiconductor (CMOS) image sensor 112 for performing image sensing functions, and a basic automatic exposure control 114 for performing basic automatic exposure control functions. In operation, the complimentary metal oxide semiconductor (CMOS) image sensor 112 provides sensor sizes of 640×480 (VGA), 800×600 (SVCA) or 1024×768 (XGA) pixels or any other larger sensor area with a 4:3 aspect ratio.

In this architecture only the necessary analog processing functions, which include the correlated double sampling (CDS) module 116 for performing correlated double sampling functions and the automatic gain control (AGC) module 118 for performing automatic gain control functions, both before an analog-to-digital conversion (ADC) module 120, which also include some basic sensor driving and adjustment functions such as a pixel access circuitry 122, the timing generator 110 and the basic automatic exposure control module 114, and which also include a digital output interface module 124 and a digital control interface module 126. All these necessary analog and digital input/output processing functions are performed and reside in the same piece of silicon, or other suitable semiconductor material. As shown, all these necessary analog processing functions, except the CDS functions, can be controlled from the integrated mobile terminal processing unit 108 over a control bus 128 that provides the integrated mobile terminal processor control signal to the single-chip camera module 106.

The Serial Buses

In order to save pins in the silicon circuitry, the buses connecting the single-chip camera module 106 and the integrated mobile terminal processor 108 are preferably serial buses. For example, a control bus 128 can be realized as a slower (less than 100 kbit/s) serial bus using a standard Universal Asynchronous Receiver/Transmitter (UARTs), which is known in the art. But because a full frame of data has to be transmitted from the CMOS image sensor 112 (i.e. sensor) to the integrated mobile terminal processor 108 (i.e. engine), the data output is preferably a very fast serial bus e.g., a so-called low voltage differential signalling (LVDS) bus 130 so raw pixel data can be quickly transmitted in serial form to the mobile terminal processing unit 108. Framing information can be coded into the signaling e.g., as proposed in Patent Application No. 991900/24514 F1.

The Pixel Data

Figure 4:
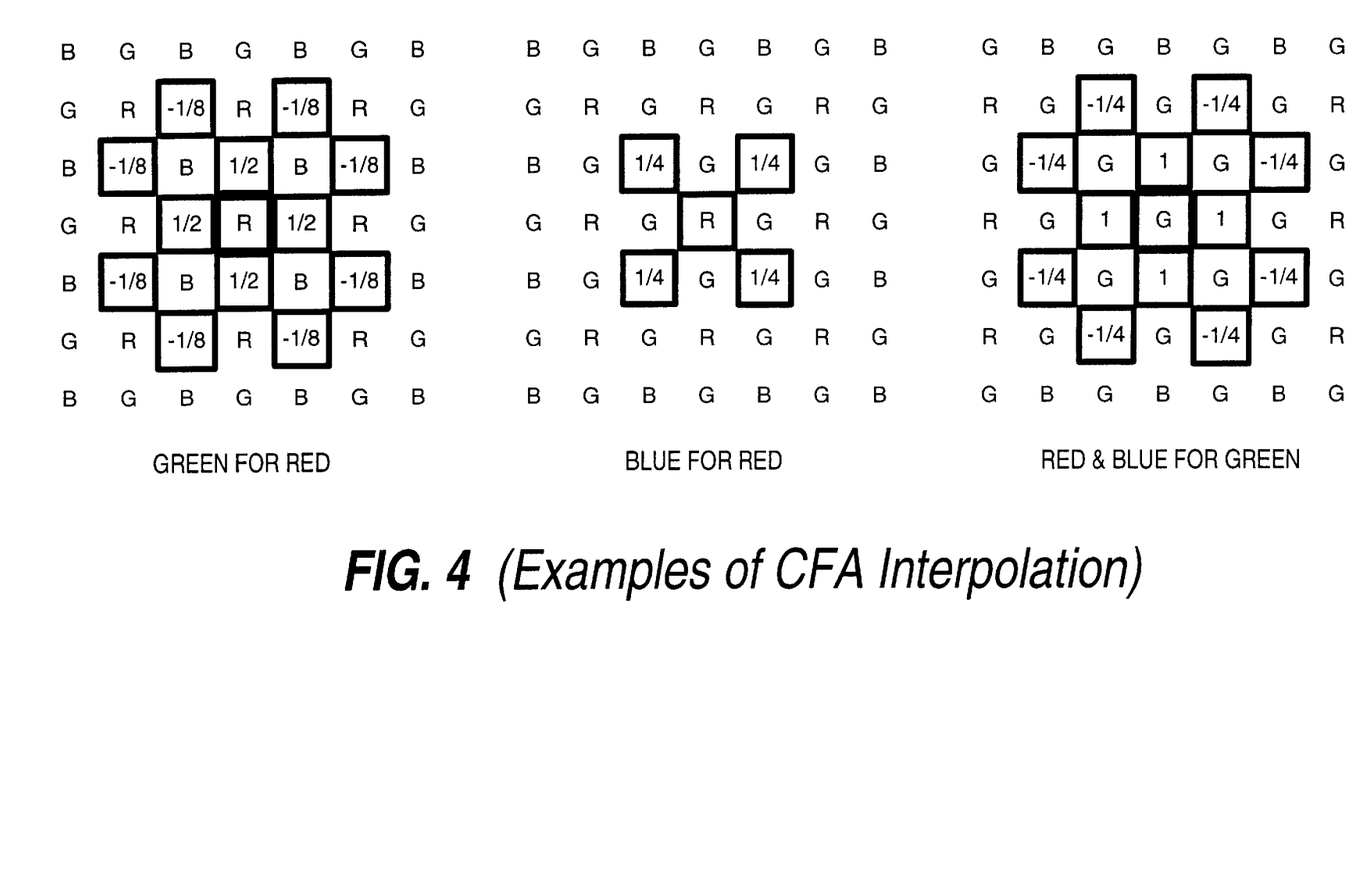
FIG. 4 is a diagram of examples of color filter array (CFA) interpolations with shading.
Figure 5:
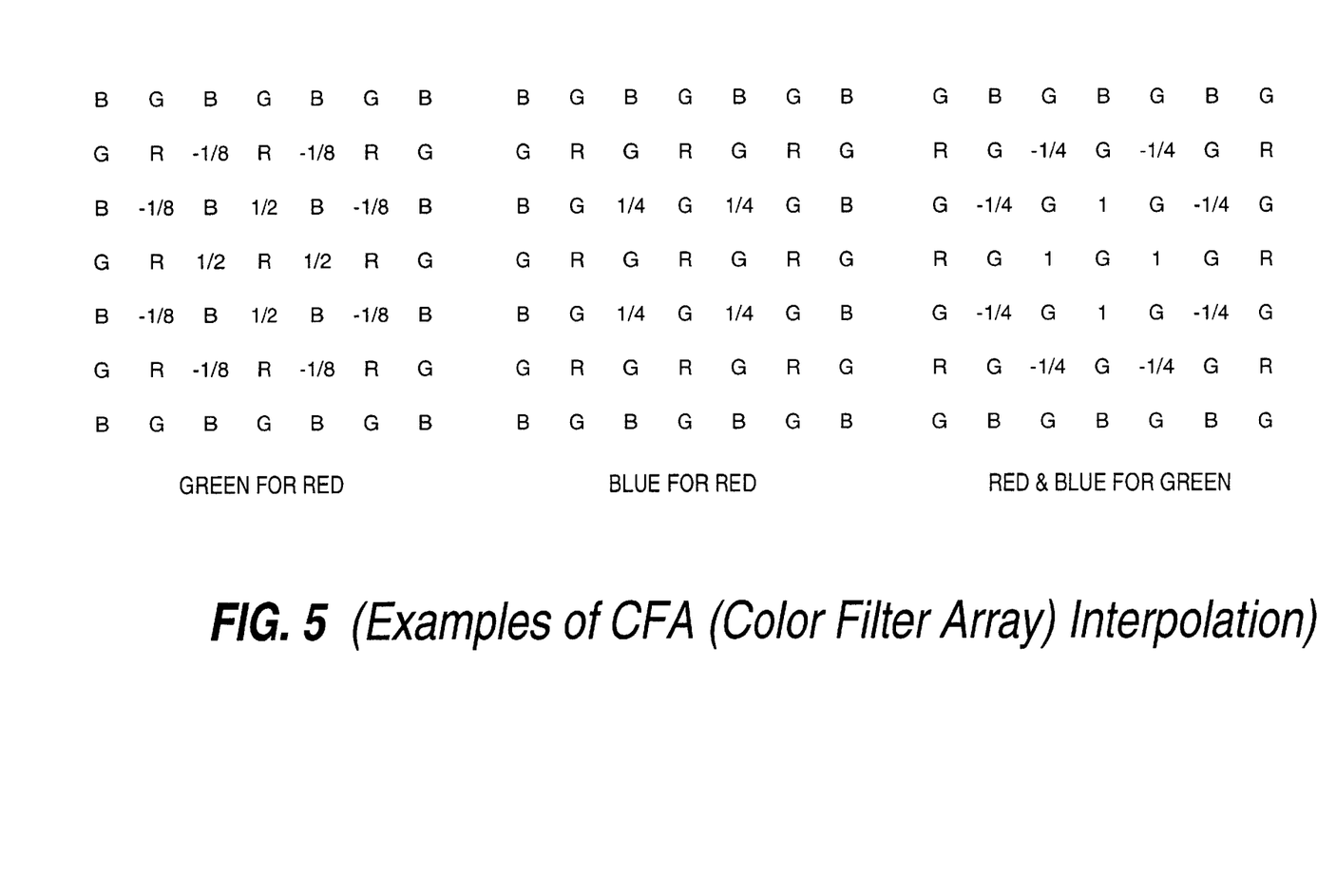
FIG. 5 is a diagram of the examples of the color filter array (CFA) interpolations in FIG. 4 without shading.

The raw pixel data can be in the form of matrix data (see FIGS. 4–5), in which each pixel is sensitive to one color only with green being the most frequent color. Full red/green/blue (RGB) presentation is calculated from the adjacent pixels by interpolation (see FIGS. 4–5). This processing requires considerable resources when done frame by frame to video data.

The raw pixel data typically has e.g., 8 or 10 bit resolution i.e., 8/10 bits/pixel, which uses a considerably smaller amount of data than RGB (which would be 3×8/10 bits/pixel) or digital component video data (e.g., YUV4:20:0 is 12 bits/pixel and YUV4:2:2 is 16 bits/pixel). This will lead to a considerably smaller frame memory 132 requirements in the integrated mobile terminal processing unit 108, especially when processing large still picture frames and also video.

Thus, processing color filter array (CFA) data in the CMOS image sensor 112 would (1) require high processing capacity and (2) create large frame memory requirements in the integrated mobile terminal processor 108.

Sub-sampling Data

The sensor array is used for capturing both still pictures and video. Still picture frame size is typically much larger than the video frame. Creating smaller frames can be done by using pixel sub-sampling i.e. by selecting certain pixels from the large array to represent the smaller frame. When this selection is done using rules presented below in the discussion of the raw RGB data, the output data will be in the form of RGB data and no CFA interpolation is needed, which saves a lot of processing power in the integrated mobile terminal processor 108. The larger the size reduction ratio is, the better this sub-sampling method works.

As described in the raw RGB format section below, the picture will be distorted and compressed horizontally with a ratio of 11:12. This is beneficial when the encoded data is viewed with 12:11 pixel aspect ratio video conferencing equipment because the resulting picture is free of vertical distortion. This is the solution for the general problem resulting from having rectangular pixels in digital cameras and 12:11 aspect ratio pixels in TV technology.

The CMOS image sensor 112 may be structured to access pixels randomly. This means, that the pixel access circuitry 122 can access certain pixels in a particular order. This order can be either fixed or programmable. It is beneficial if the pixel access circuitry 122 is programmable, e.g. in the form of a look-up table, because it can be used both for controlling pixel sub-sampling and removing known dead pixels from the output data. The latter functionality is also called Dead Pixel Concealment (DPC) and it is needed because the CMOS image sensor 112 may have non-functional dead pixels. Implementing DPC in the camera sensor will improve processing yield and lower production costs.

Raw RGB Format Scaling/subsampling to Different Common Used Resolutions with Varied Aspect Ratios When the aspect ratio of an image's resolution changes in the scaling process, there are two ways to manage it. Scaling can be done using the whole usable area of raw source image. This method will flatten the destination image in VGA 4:3 to CIF 11:9 aspect ratio, but the image will be suitable for rectangular pixel aspect ratio using display, like television. The other method that keeps the image as source ratio is that some regions are cropped away from the source.

Method for Aspect Ratio Conversion

The general purpose mathematical specification for an aspect ratio conversion is set forth below.

The method to calculate maximum two-dimensional 11:9 area in a 4:3 area is determined using Equation 1, as follows:

$$x_c = \text{Hor} - (11/9)^*(\text{Ver} - y_c),$$

where Hor equals the horizontal width of the source image, Ver equals the vertical height of the source image, $x_c$ equals a number of units to crop out from the source horizontal width, $y_c$ equals a number of units to crop out from the source vertical height, $y_c = 0, 1, 2, 3 \ldots$ until the answer $x_c$ is an integer.

When corresponding $x_c$ and $y_c$ are found, the destination area is determined by using Equation 2, as follows:

$$\text{Hor}_{dest} = \text{Hor} - x_c \text{ and } \text{Ver}_{dest} = \text{Ver} - y_c$$

Example of Aspect Ratio Conversion

The following is an example of an aspect ration conversion for Hor=1024 and Ver=768.

The maximum two-dimensional 11:9 area in a 4:3 area using Equation 1 is determined, as follows:

$$y_c = 0: x_c = 1024 - (11/9)^*(768 - 0) = 85.33 \text{ (Non-integer)}$$

$$y_c = 1: x_c = 1024 - (11/9)^*(768 - 1) = 86.56 \text{ (Non-integer)}$$

$$y_c = 2: x_c = 1024 - (11/9)^*(768 - 2) = 87.78 \text{ (Non-integer)}$$

$$y_c = 3: x_c = 1024 - (11/9)^*(768 - 3) = 89 \text{ (Integer)}$$

The destination area using Equation 2 is determined, as follows:

$$\text{Hor}_{dest} = 1024 - 89 = 935$$

$$\text{Ver}_{dest} = 768 - 3 = 765$$

This mathematical analysis makes it possible to generate maximum pixel count with 11:9 aspect ratio from any 4:3 source pixel area.

Usable Resolutions in Cropping Method

Table 1 shows largest usable areas that can be used in 4:3>11:9 aspect ratio scaling.

TABLE 1

Usable Resolutions in Cropping Method

| Source | RESOLUTION HOR | VER | Aspect ratio change | Usable dest. Resolution HOR | VER | Cropped pixels HOR | VER |
|---|---|---|---|---|---|---|---|
| XGA | 1024 × | 768 | ¾ >> 9/11 | 935 × | 765 | 89 | 3 |
| SVGA | 800 × | 600 | ¾ >> 9/11 | 726 × | 594 | 74 | 6 |
| VGA | 640 × | 480 | ¾ >> 9/11 | 583 × | 477 | 57 | 3 |

About 11% of horizontal and less than 1% of vertical scene information is loosed when using cropping. Table 2 shows the scaling ratios for different resolutions when cropping is used. Table 3 contains scaling ratios for non-cropping use.

TABLE 2

Needed Pixels for Each Source Unit using cropping method

| | Scaling process HOR | VER | | HOR | VER | HOR out | from | VER out | from |
|---|---|---|---|---|---|---|---|---|---|
| XGA | 1024 × | 768 | >> CIF | 352 × | 288 | 32 | / 85 | 32 | / 85 |
| XGA | 1024 × | 768 | >> QCIF | 176 × | 144 | 16 | / 85 | 16 | / 85 |
| SVGA | 800 × | 600 | >> CIF | 352 × | 288 | 16 | / 33 | 16 | / 33 |
| SVGA | 800 × | 600 | >> QCIF | 176 × | 144 | 8 | / 33 | 8 | / 33 |
| VGA | 640 × | 480 | >> QCIF | 640 × | 480 | 16 | / 53 | 16 | / 53 |

TABLE 3

Needed pixels for each source unit using noncropping method

| | Scaling process HOR | VER | | HOR | VER | HOR out | from | VER out | from |
|---|---|---|---|---|---|---|---|---|---|
| XGA | 1024 × | 768 | >> CIF | 352 × | 288 | 11 | / 32 | 3 | / 8 |
| XGA | 1024 × | 768 | >> QCIF | 176 × | 144 | 11 | / 64 | 3 | / 16 |
| XGA | 1024 × | 768 | >> SubQCIF | 128 × | 96 | 1 | / 8 | 1 | / 8 |
| SVGA | 800 × | 600 | >> CIF | 352 × | 288 | 11 | / 25 | 12 | / 25 |
| SVGA | 800 × | 600 | >> QCIF | 176 × | 144 | 11 | / 50 | 6 | / 25 |
| SVGA | 800 × | 600 | >> SubQCIF | 128 × | 96 | 4 | / 25 | 4 | / 25 |
| VGA | 640 × | 480 | >> CIF | 352 × | 288 | 11 | / 20 | 3 | / 5 |
| VGA | 640 × | 480 | >> QCIF | 640 × | 480 | 11 | / 40 | 3 | / 10 |
| VGA | 640 × | 480 | >> SubQCIF | 128 × | 96 | 2 | / 10 | 2 | / 10 |

As it can be seen from Tables 2 and 3, the amount of the destination pixel is less than half of the source pixels. This makes it possible to just collect needed pixels from the source, because the smallest element that contains all color components in raw image is 2×2 matrix, e.g. as a Bayer format raw image.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A mobile terminal having a lens/filter combination for responding to an image, and providing an optical image signal, the mobile terminal comprising:

a single-chip camera module, responsive to the optical image signal, and further responsive to an integrated mobile terminal processor control signal, for performing analog image processing functions before an analog-to-digital conversion (ADC), basic sensor driving and adjustment functions, and digital input/output (I/O) functions, and providing a sensor data output signal and a single-chip camera module control bus signal; and an integrated mobile terminal processor, responsive to the sensor data output signal, and further responsive to the single-chip camera module control bus signal, for performing camera control and data conversion functions, and for providing the integrated mobile terminal processor control signal.

2. A mobile terminal according to claim 1, wherein the analog image processing functions include correlated double sampling (CDS) and automatic gain control (AGC).

3. A mobile terminal according to claim 1, wherein the basic sensor driving and adjustment functions include pixel access, timing and basic automatic exposure control.

4. A mobile terminal according to claim 1, wherein the integrated mobile terminal processor 108 performs data conversion, as well as camera control functions and overrides basic sensor driving and adjustment functions in operation.

5. A mobile terminal according to claim 1, wherein the lens/filter combination includes an infrared filter.

6. A mobile terminal according to claim 1, wherein the single-chip camera module includes a complimentary metal oxide semiconductor (CMOS) image sensor for performing image sensing functions.

7. A mobile terminal according to claim 1, wherein the complimentary metal oxide semiconductor (CMOS) image sensor provides sensor sizes of 640×480 (VGA), 800×600 (SVCA) or 1024×768 (XGA) pixels or any other larger sensor area with a 4:3 aspect ratio.

8. A mobile terminal according to claim 1, wherein the single-chip camera module includes a timing generator for performing timing generator functions.

9. A mobile terminal according to claim 1, wherein the single-chip camera module includes a basic automatic exposure control for performing basic automatic exposure control functions.

10. A mobile terminal according to claim 1, wherein the single-chip camera module includes a pixel access circuit for performing pixel access functions.

11. A mobile terminal according to claim 10, wherein the pixel access circuit is a programmable sensor read access circuit for performing red/green/blue sub-sampling.

12. A mobile terminal according to claim 10, wherein the pixel access circuit is a programmable sensor read access circuit using a dead pixel concealment algorithm.

13. A mobile terminal according to claim 1, wherein the single-chip camera module includes a correlated double sampling (CDS) module for performing correlated double sampling functions.

14. A mobile terminal according to claim 1, wherein the single-chip camera module includes an automatic gain control (AGC) module for performing automatic gain control functions.

15. A mobile terminal according to claim 1, wherein the single-chip camera module includes a digital output interface for performing digital output interface functions between the single-chip camera module and the integrated mobile terminal processor, including providing the sensor data output signal as a raw sensor data signal.

16. A mobile terminal according to claim 1, wherein the single-chip camera module includes a digital output interface that is a serial bus.

17. A mobile terminal according to claim 16, wherein the serial bus using some form of low voltage differential signaling.

18. A mobile terminal according to claim 1, wherein the single-chip camera module includes a digital control interface for performing digital control interface functions between the single-chip camera module and the integrated mobile terminal processor, including exchanging the single-chip camera module control bus signal and the integrated mobile terminal processor control signal between the single-chip camera module and the integrated mobile terminal processor.

19. A mobile terminal according to claim 18, wherein the digital control interface is a serial bus.

20. A mobile terminal according to claim 1, wherein the sensor data output signal includes either a raw sensor data output signal or a sub-sampled red/green/blue sensor data output signal.

21. A mobile terminal according to claim 20, wherein the sub-sampled red/green/blue sensor data output signal includes red/green/blue sub-sampling having a 11:12 horizontal compression ratio for distortion free viewing in TV technology based terminals.

* * * * *